July 23, 1946. E. H. SCHMITT 2,404,751
GAUGE
Filed April 27, 1944
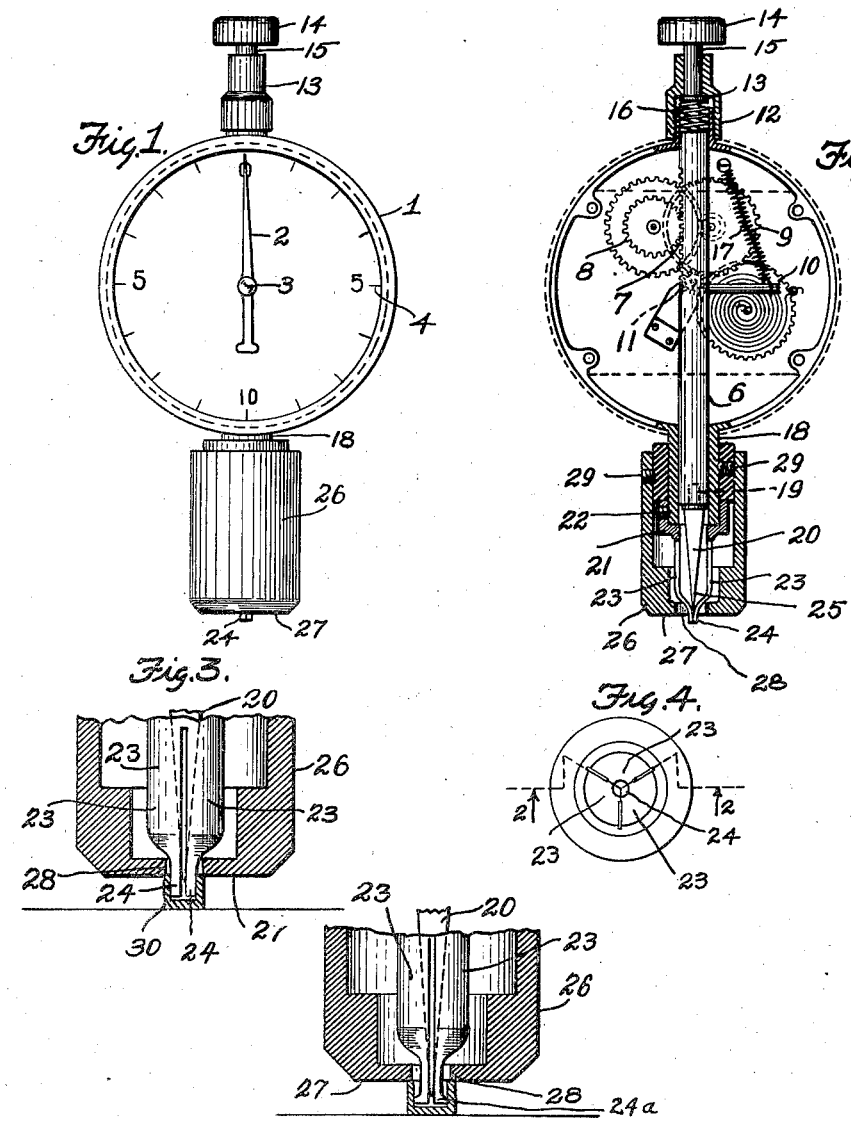
EDWIN H. SCHMITT, INVENTOR.
BY Allen & Allen
Attorneys Patented July 23, 1946

2,404,751

UNITED STATES PATENT OFFICE 2,404,751

GAUGE

Edwin H. Schmitt, Cincinnati, Ohio

Application April 27, 1944, Serial No. 533,002

2 Claims. (Cl. 33—178)

My invention relates generally to gauges and more specifically to a gauge for determining the diameter of the internal bore of a hole particularly where the diameter is in small dimensions such as three-sixteenths inch or less.

In determining the diameter of a bored hole of small dimensions, the only gauges which are available on the market, depend for their operation on instruments which seat in the bottom of the hole and in which the diameter of the hole is then determined. There are as far as I am advised, no gauges for determining the diameter of blind holes.

It is not always practical to determine the diameter of a hole by an instrument which has to extend to the bottom of the hole, particularly when the bores to be gauged are of small diameter.

It is the object of my invention to provide a gauge for determining the internal bore or diameter of a hole which has a guide in operative association with the gauge, which permits manipulation without the instrument extending down to the bottom of the hole.

It is a further object of my invention to provide a simple device which will gauge the internal bore of a hole with great precision and accuracy, but which may be rapidly manipulated so as to be available for inspection work in connection with large scale factory production of small parts.

It is a further object of my invention to provide a gauge for determining the internal bore of a small hole which will be substantially foolproof so that an ordinary factory operative can manipulate the gauge simply and accurately.

The foregoing objects and other objects to which I will refer in the ensuing specification, I accomplish by that certain combination and arrangement of parts of which I have shown a preferred embodiment.

In the drawing:

Figure 1 is a side elevation of the gauge showing approximately the dimensions of one type of such gauge.

Figure 2 is a section through the gauge shown in Figure 1.

Figure 3 illustrates an enlarged sectional view showing parts of the gauge in operation.

Figure 4 is a bottom plan view of the gauge.

Figure 5 is a detailed sectional view similar to Figure 3 but showing a modified type of gauge tip.

I have shown a casing 1, having a visible indicator 2, mounted on a pivot 3, and with the dial 4, the gradations of which are traversed by the point of the indicator 2.

Preferably the indicator will be encased with a glass front like a watch to prevent the indicator from being injured during use of the gauge. Through the casing 1 there extends a plunger rod 6, which has a rack portion 7, which contacts a pinion 8. Through a chain of gears 9, 10, and 11, the spindle of the indicator is rotated, the movement of the plunger rod 6 being greatly magnified in the corresponding movement of the tip of the indicator 2, so that a very slight movement of the plunger rod will result in a readily visible movement of the indicator.

The casing has a threaded tubular portion 12 which is engaged by an internally threaded bushing 13. A manual push button 14 mounted on the rod 15, presses against a spring 16, which causes movement of the plunger rod 6. A spring 17, as illustrated in Figure 2, causes the plunger rod 6 to be brought back to its original starting position at the end of each gauging measurement wherein the push button 14 is depressed.

The casing 1 has a tubular extension 18, through which the plunger rod 6 extends. The plunger rod 6 has an internally threaded bore 19 into which is screwed a conical shaped tip 20.

Also mounted on the tube 18 is a gauge member having an annular base 21, which may be adjustably mounted on the tube 18 by means of set screws 22 and trifurcated arms 23, extending down in a sector-like formation, and with the ends of the arms 23 bent inwardly so that the tips 24 approach a common point.

By observing Fig. 2, it will be seen that the conical shaped member 20 has the outer surface of its point as indicated at 25, engaging the inner surfaces of the tips 24 of the gauge element.

Observing Figure 2, it will be noted that as the conical end 25 is depressed, the tips 24 are spread, and when the tips 24 engage the walls of the hole, the diameter of which is being determined, no further downward movement of the conical shaped member 25 is possible. At this position of movement, the movement of the indicator 2 from its starting position will accurately determine the diameter of the hole within which the tips 24 have been expanded.

A guide member 26 of tubular shape, has a lower surface 27 and a hole 28 through which the gauge tips 24 extend. The guide member 26 may be mounted on the tube 18 as by means of set screws 29. In Figure 5 there is shown a modified type of gauge tip 24a which is somewhat better adapted for measuring the diameter of a blind hole.

In Figure 3 there is indicated at 30, a very small bearing which however, forms an important structural part of a certain type of gauge for an airplane. It is essential during inspection that the bore in the bearing 30 be accurately gauged, because if it is not, the instrument of which it forms a part will not be accurate. The bearing 30 is greatly magnified in the drawing in Fig. 3. As a matter of fact, the entire bearing is so small that it is difficult to hold it in the hands.

Observing Figure 3, it will be noted that the member 26 to which we have referred, as a guide, but which might also be called a guard or a depth gauge bushing, has its opening 28 sufficiently smaller than the outside diameter of the bearing 30, so that the bearing will not slide up on the gauge tips. By setting the guide on the tube 18, in a desired position by means of the set screws 29, the distance into which the gauge tips, during the gauging operation, will extend into the bore of the hole being measured, may be accurately determined, or held to tolerances of such dimensions as .0001 inch or the like.

When the gauge tips are in closed position, they form a very small circular formation, which is accurately machined so that not only the diameter but the contour of a small internal bore may be determined.

If, for example, the hole is out of round, one of the tips may be moved farther than the other two, and this movement will show on the gauge by permitting movement of the indicator beyond the position which is indicated with a truly round bore.

Thus the device is available for quantity and high speed production gauging work, and the operation is so simple that an ordinary operator can perform this task.

It should be noted that the particular arrangement of the gears and springs and indicating finger form no part of my invention. The parts can be attached to any standard indicator. My invention is primarily directed towards the gauge tip, its adjustable mounting and the adjustable mounting of the depth controlling guide member.

Modifications in the particular construction illustrated and described will readily occur to those skilled in the art without departing from the novel principle involved.

Having thus described my invention, what I claim as new and desire to secure by Letters Patent is:

1. A gauge for determining the diameter of a hole comprising in combination with a casing having a visible indicator for indicating movement of a plunger rod passing through said casing, a plunger rod, means for manually moving the plunger rod, a tubular member through which said rod extends, a conical shaped member mounted at an end of said rod, a gauge member mounted on said tubular member and comprising an annular base having arms extending sector like toward a common point, said arms having gauge tips arranged in position to have their inner surfaces engaged by the point of said conical member, and a guide carried by said tubular member for limiting the depth to which said gauge tips may extend into a hole the diameter of which is being determined.

2. A gauge for determining the diameter of a hole comprising in combination with a casing having a visible indicator for indicating movement of a plunger rod passing through said casing, a plunger rod, means for manually moving the plunger rod, a tubular member through which said rod extends, a conical shaped member mounted at an end of said rod, a gauge member mounted on said tubular member and comprising an annular base having arms extending sector like toward a common point, said arms having gauge tips arranged in position to have their inner surfaces engaged by the point of said conical member, a guide carried by said tubular member for limiting the depth to which said gauge tips may extend into a hole the diameter of which is being determined, and means for adjusting the position of said guide on said tubular member.

EDWIN H. SCHMITT.